US012590901B2

(12) United States Patent
     Isken et al.

(10) Patent No.: US 12,590,901 B2
(45) Date of Patent: Mar. 31, 2026

(54) METHOD FOR INSPECTING A COATED SURFACE FOR COATING DEFECTS

(71) Applicant: EVONIK OPERATIONS GMBH, Essen (DE)

(72) Inventors: Philipp Isken, Altenberge (DE); Simon Heeg, Griesheim (DE); Claudia Jansen, Leverkusen (DE); Claudia Bramlage, Essen (DE); Udo Goecke, Frankfurt am Main (DE); Oliver Kroehl, Cologne (DE); Stefan Silber, Krefeld (DE); Gaetano Blanda, Haltern am See (DE)

(73) Assignee: Evonik Operations GmbH, Essen (DE)

( * ) Notice: Subject to any disclaimer, the term of this patent is extended or adjusted under 35 U.S.C. 154(b) by 323 days.

(21) Appl. No.: 18/184,095

(22) Filed: Mar. 15, 2023

(65) Prior Publication Data

US 2023/0304940 A1    Sep. 28, 2023

(30) Foreign Application Priority Data

Mar. 22, 2022    (EP) ..................................... 22163637

(51) Int. Cl.
     *G01N 21/88*        (2006.01)
     *G06T 7/00*         (2017.01)
                   (Continued)

(52) U.S. Cl.
     CPC ..... *G01N 21/8806* (2013.01); *G01N 21/8851* (2013.01); *G06T 7/0002* (2013.01);
                   (Continued)

(58) Field of Classification Search
     CPC .......... G01N 21/8806; G01N 21/8851; G01N 2021/8427; G01N 2021/8809;
                   (Continued)

(56) References Cited

U.S. PATENT DOCUMENTS 6,088,116  A   7/2000  Pfanstiehl
6,462,813  B1  10/2002  Haven et al.
                (Continued)

FOREIGN PATENT DOCUMENTS

CN    111444617  A   7/2020
EP      2602763  A1  6/2013
                (Continued)

OTHER PUBLICATIONS

Extended European Search Report, dated Jun. 23, 2021, issued in corresponding European Patent Application No. 20196660.3.
(Continued)

*Primary Examiner* — Alazar Tilahun
(74) *Attorney, Agent, or Firm* — Harness, Dickey & Pierce, P.L.C.

(57)    ABSTRACT

The invention relates to a method for inspecting a coated surface for a surface defect. The method comprises: using (102) a device (200, 300, 400, 700, 800, 900) for covering the coated surface to be inspected, the device being configured to create an enclosed space to isolate the surface coating to be inspected from ambient illumination in order to provide predefined photographic acquisition conditions within the enclosed space; acquiring (104) a photo of the coated surface being within the enclosed space; and inspecting (106) the photo for the presence of the surface defect.

20 Claims, 5 Drawing Sheets

(51) Int. Cl.

| | |
|---|---|
| *H04N 23/51* | (2023.01) |
| *H04N 23/56* | (2023.01) |
| *H04N 23/60* | (2023.01) |
| *H04N 23/62* | (2023.01) |
| *H04N 23/667* | (2023.01) |
| *G01N 21/84* | (2006.01) |

(52) U.S. Cl.
   CPC ............. *H04N 23/51* (2023.01); *H04N 23/56* (2023.01); *H04N 23/62* (2023.01); *H04N 23/64* (2023.01); *H04N 23/667* (2023.01); *G01N 2021/8427* (2013.01); *G01N 2021/8809* (2013.01); *G01N 2021/8835* (2013.01); *G01N 2201/126* (2013.01); *G06T 2200/24* (2013.01); *G06T 2207/20081* (2013.01)

(58) Field of Classification Search
   CPC ..... G01N 2021/8835; G01N 2201/126; G01N 21/88; G06T 7/0002; G06T 2200/24; G06T 2207/20081; G06T 7/0004; H04N 23/51; H04N 23/56; H04N 23/62; H04N 23/64; H04N 23/667; G06N 20/00; G06V 10/12; G06V 10/40; G06V 10/765
   See application file for complete search history.

(56)           References Cited

U.S. PATENT DOCUMENTS

| | | | | |
|---|---|---|---|---|
| 6,542,248 | B1 | 4/2003 | Schwarz | |
| 6,822,734 | B1 * | 11/2004 | Eidelman | ........... G01N 21/8806 |
| | | | | 356/601 |
| 10,240,982 | B2 | 3/2019 | Shimada | |
| 11,131,635 | B2 | 9/2021 | Gupta et al. | |
| 2004/0252308 | A1 | 12/2004 | Prakash et al. | |
| 2012/0026512 | A1 | 2/2012 | Schwarz | |
| 2017/0069075 | A1 | 3/2017 | Okuda | |
| 2019/0287237 | A1 | 9/2019 | de Bonfim Gripp et al. | |
| 2020/0257933 | A1 | 8/2020 | Steingrimsson et al. | |
| 2021/0356404 | A1 * | 11/2021 | Safai | ...................... B33Y 10/00 |
| 2022/0082508 | A1 * | 3/2022 | Isken | .................... G06N 20/00 |

FOREIGN PATENT DOCUMENTS

| | | | |
|---|---|---|---|
| KR | 2019-0032908 | A | 3/2019 |
| WO | WO-2018/208360 | A2 | 11/2018 |
| WO | WO-2019/171498 | A1 | 9/2019 |

OTHER PUBLICATIONS

Khalaj, G., "Artificial neural network to predict the effects of coating parameters on layer thickness of chromium carbonitride coating on pre-nitrided steels", Neural Computing and Applications, vol. 23, 2013, pp. 779-786, XP055811071.

Tatlier, M. et al., "Coatings of Na-aluminosilicate zeolites prepared using predictions from an artificial neural network method", Journal of Porous Materials, vol. 15, 2008, pp. 389-395, XP019609386.

Li, J. et al., "A Review on High Entropy Alloys Coatings: Fabrication Processes and Property Assessment", Advance Engineering Materials, vol. 21, 2019, 1900343, pp. 1-27, XP055813202.

Search Report for European Application No. 22163637.6 dated Sep. 12, 2022.

Extended European Search Report, dated Aug. 4, 2023, issued in corresponding European Patent Application No. 23158672.8.

Office Action dated Jul. 22, 2025 issued in corresponding Japanese Patent Application No. 2023-044752.

Abhishek Dutta and Andrew Zisserman (2019): The VIA annotation software for images, audio and video. Proceedings of the 27th ACM International Conference on Multimedia (MM '19), Oct. 21-25, 2019, Nice, France. ACM, New York, NY, USA, 4 pages. DOI: https://doi.org/10.1145/3343031.3350535.

Office Action dated Jan. 6, 2026 issued in corresponding Japanese Patent Application No. 2023-044752.

* cited by examiner

Using a device for covering the coated surface to be inspected — 102

Acquiring a photo of the coated surface being within the enclosed space — 104

Inspecting the photo for the presence of the surface defect — 106

METHOD FOR INSPECTING A COATED SURFACE FOR COATING DEFECTS

FIELD OF THE INVENTION

The invention relates to the identification of coating defects and to the characterization of coated surfaces, in particular coated surfaces based on coating compositions for paints, varnishes, printing inks, grinding resins, pigment concentrates or other coating compositions.

BACKGROUND

Paint and varnish coatings can have a variety of defects that negatively influence the appearance or technical properties of the coated object. The coating defects can be, for example, foam, craters, clouding, levelling problems, wetting problems, floating of pigments (floating), sagging, agglomeration, or bubble formation, whereby several defects can occur simultaneously and can influence each other. To investigate and avoid these problems, test substrates are coated with the formulation during formulation development and examined for defects. Depending on the intended field of application, different substrates are used, for example wood, plastic, paper/cardboard, glass, or metal. Furthermore, different pretreatments of the substrate are possible, and the pretreatments may further complicate matters.

Currently, the defects are assessed visually by a human being, e.g. an employee. This purely visual assessment is typically very coarse-grained, highly subjective and hardly reproducible. As a consequence, the identification of defects and the assessment of the quality of the coated surface may require a great deal of experience on the part of the employee but may nevertheless vary strongly which makes it difficult to compare the results. For example, table lamps or even daylight coming in through a window are used to illuminate the test substrates. The coating defects determined manually with this method are hardly comparable due to variances of different environmental parameters.

SUMMARY

It is an objective of the present invention to provide an improved method and device for inspecting a coated surface for a surface defect as specified in the independent claims. Embodiments of the invention are given in the dependent claims. Embodiments of the present invention can be freely combined with each other if they are not mutually exclusive.

In one aspect, the invention relates to a method for inspecting a coated surface for a surface defect. The method comprises:

using a device for covering the coated surface to be inspected, the device being configured to create an enclosed space to isolate the surface coating to be inspected from ambient illumination in order to provide predefined photographic acquisition conditions within the enclosed space;

acquiring a photo of the coated surface being within the enclosed space; and inspecting the photo for the presence of the surface defect.

This may be advantageous because the device ensures that the surface is illuminated in a defined and reproducible manner, so that the photos taken of coating defects provide reproducible results that are comparable with results obtained from other photos in terms of the type and number of coating defects observed. The device thus prevents variability, e.g., with respect to the illumination intensity or the illumination angle, which is unavoidable when using daylight or table lamps. For example, the incidence of daylight through a window depends on the time of day, season and weather conditions. When using a table lamp, there is a risk that the lamp may have been moved, or turned on the work table, or the lamp holder swiveled, either knowingly or unknowingly. Also, objects placed close to the coated surface to be photographed can cause light reflections, so that the surface is occasionally illuminated by an additional light source. To the contrary, the use of the device allows to protect and isolate the coated surface from ambient illumination in order to provide predefined photographic acquisition conditions within the enclosed space.

It has been found that the conditions under which photos are taken have a considerable influence on the coating defect detection result. This is especially the case for very small coating defects, such as micro foam. Due to the small size of some defects, unfavorable photo conditions can lead to the defects no longer being recognizable on the image. Embodiments of the invention ensure that the photos are taken under optimum or at least sufficiently suited conditions and allow keeping the conditions constant to ensure comparability of the results.

Optimal and constant photo conditions may be achieved by devices as described herein for embodiments of the invention. The device may comprise one or more photographic components (light sources, camera, sample carrier) for acquiring a photo, whereby the device components are coordinated with each other. Since different coating defect types have been observed by the applicant to require different photographic conditions, the components can be adjusted (automated, if necessary) for the respective type and, if necessary, calibrated.

Embodiments of the invention may allow shielding the coated surface from the influence of ambient light, ensuring constant, defined photo conditions, reproducible image analysis results and reproducible defects identification results. This may be of particular benefit when the photos are inspected automatically by means of an image analysis software and/or are used as training images for performing a machine-learning method to create a predictive model for the detection and/or characterization of coating defects.

According to embodiments, the device comprises:

a housing being non-transmissive to light; the use of the device comprises covering the coated surface; For example, the use of the device comprises can comprise covering the coated surface with the housing of the device; according to some embodiments, the housing has an open side and the use of the device comprises contacting the open side of the housing with the coated surface; and/or one or more light sources; and/or at least one device-internal camera and/or a camera housing opening for enabling at least one device-external camera to capture an image of the sample through the camera housing opening; the acquisition of the photo is performed with the at least one camera.

According to embodiments, the device further comprises:

a sample carrier for carrying a coated sample comprising the coated surface; the use of the device for covering the coated surface comprises placing a sample on the sample carrier; and/or a coated-surface-opening; the coated-surface-opening is an opening within a wall of the housing referred to as contacting wall; the contacting wall is a wall of the housing intended for contacting of the coated surface;

the use of the device for covering the coated surface comprises bringing the contacting wall in contact with the coated surface; and/or a sample-position marking; the marking indicates a position inside the device where a sample with the coated surface is to be placed.

A "camera housing opening" is an opening is adapted to (e.g. sized and shaped to) enable at least one device-external camera to capture an image of the sample through the camera housing opening. For example, the device external camera can be the camera of a portable telecommunication device placed on top of the outer surface of the housing wall with the camera housing opening such that the telecommunication device completely devices the camera housing opening. Thereby, the housing of the device and the telecommunication device placed over the camera housing opening together isolate the surface coating within the device from ambient light. According to embodiments, the camera housing opening is size adjustable. For example, the camera housing opening may have one or more sliding doors or panels that allow the size of the camera housing opening to be changed. This can have the advantage that the camera housing opening can be adapted to the different sizes of different smartphones or document cameras.

According to embodiments, photo is acquired in the form of a digital image depicting the coated surface of the sample.

The use of a device with at least one light source may have the advantage that the intensity of the light source(s), the position and/or illumination angle of each light source may have defined, reproducible properties. According to preferred embodiments, the at least one light source is a light source whose vertical and/or horizontal position within the device, whose intensity, whose color spectrum and/or whose illumination angle is controllable and adjustable and hence may allow taking photos of coated surfaces at a predefined illumination intensity, illumination spectrum, light source position and/or illumination angle.

The use of a sample carrier may have the advantage that the sample with the coated surface may have a defined, reproducible position relative to the housing of the device. According to preferred embodiments, the sample carrier is a sample carrier whose height and/or position within the interior of the device can be manually or automatically adjusted. This may allow taking photos of coated surfaces at a predefined distance from the at least one light source and the at least one camera.

Embodiments in which the housing comprises a coated-surface-opening may have the advantage that the device can be used very flexibly. For example, the device can have the shape of a cuboid or a cylinder, which has the said "coated-surface-opening" on a (preferably flat) housing surface. The device can now be contacted with any coated surface. For example, the coated surface may be a horizontally oriented surface, such as the table top of a table, and the device may simply be placed on the table top with its "contact side" facing downwards (the contact side may be the "bottom side"). According to other examples, the coated surface may be a vertically oriented surface, such as a coated window, or a coated vehicle door. The device may simply be pressed against the vertically oriented surface with its contact side including said "coated-surface-opening" and held so during image capture. Preferably, the coated-surface-opening is smaller than the area of the coated surface and the coated surface is approximately flat. This allows the device to sit flush on the coated surface and allows little or no ambient light to enter the interior of the device.

The use of a device with at least one device-internal camera may have the advantage that the position and/or image acquisition angle of each camera may have defined, reproducible properties. According to preferred embodiments, the at least one device-internal camera is a camera whose vertical and/or horizontal position within the device, and/or whose orientation and hence also the image acquisition angle is controllable and adjustable. This may allow taking photos of coated surfaces at a predefined image acquisition angle and/or at a predefined distance.

The use of a camera housing opening may have the advantage that is allows using ubiquitously available cameras, e.g. cameras of telecommunication devices such as smartphones, for acquiring photos of the coated surface. As the telecommunication device has to be placed always on the same position to ensure the camera of the telecommunication device is positioned over the camera housing opening, it is ensured that the distance between camera and the coated surface is a defined and reproducible distance.

According to some embodiments, the method comprises storing the acquired digital image on a storage medium. For example, the storage medium can be a data storage medium which is provided as a component of the device. Alternatively, the storage medium can be a storage medium of a portable telecommunication device or a portable data carrier, such as a chip card or a USB stick, which may be operatively coupled or couplable to a controller module of the device. In addition, or alternatively, the image is stored on a remote server computer. For example, the device can comprise an interface for operatively coupling the device with a controller module running on an external data processing device such as a portable telecommunication device. The interface can be configured to receive control commands to the controller module and/or to send device status information and/or acquired images to the controller module.

According to some embodiments, the method comprises transferring the acquired digital image to an image analysis software configured to perform the image analysis. For example, the image analysis software can be provided as an integral part of the device, or can be run on a portable telecommunication device being interoperable with the device, and/or can be run on a server-computer system interoperable with the device or the telecommunication device.

Running the image analysis software on the telecommunication device or the server may have the advantage that typically, the server and the telecommunication device will have a greater computational capacity than a control unit provided as a component of the device.

According to embodiments, the device comprises and/or is operatively coupled to a controller module. The controller module can be, for example, an integral part of the device or can be a device-external component, whereby the device comprises an interface for exchanging data with the device-external control module. The control module can be configured to control the operation of the device such that it operates and acquires photos only at defined, coating-defect types specific modes of operation. For example, the controller module can be based on software, firmware, hardware or a combination of two or more of the foregoing items.

According to embodiments, the method further comprises:

providing a configuration, the configuration comprising a plurality of assignments, each assignment assigning one out of a plurality of different coating defect types to one out of multiple device settings, each device setting determining one or more device configuration parameters which specify the position and/or mode of operation of one or more components of the device;

receiving, by the controller module, a selection of at least one of the coating defect types;

identifying, by the controller module, a device setting stored in the configuration in association with the selected coating defect type;

modifying, by the controller module, at least one component of the device, the at least one component being selected from a group comprising a camera, a light source and/or of a sample carrier, in accordance with the identified device setting, thereby setting the operation mode of the device to a defect-type specific image acquisition mode.

The acquisition of the photo is performed while the device is in the defect-type specific image acquisition mode.

For example, the configuration can be one or more configuration files or can comprise one or more data records stored in a database.

This may have the advantage that the device can be operated in one out of a plurality of predefined, coating-defect type specific operation modes. Each operation mode may comprise a predefined selection of light sources and/or cameras to be used for illuminating the sample and for capturing the photo. This may ensure that for a specific type of coating defect, a specific mode of operation is set, thereby ensuring that for each defect type, optimal or at least highly favorable image acquisition conditions exist which will allow a human inspector or an image analysis program to easily detect and/or quantify the defects of the said defect type. According to some embodiments, the device comprises an interface enabling another component, e.g. the controller module, to cause the device to switch from one defect-type specific mode of operation to another defect-type specific mode. The operational state of the device may be changed and set to a different mode of operation in response to a user's selection of one or more coating defect types to be detected. Setting the device to a particular defect-type specific mode of operation may comprise setting the state (e.g. one or more properties such as position, orientation, intensity, etc.) of one or more components of the over in accordance with a device setting specified in the configuration for the selected defect type. The applicant has observed that the environmental parameters such as light intensity, angle of incidence, distance from specimen to camera, etc. which are suited or optimal for detecting and/or quantifying a given defect type can vary greatly for different defect types. By adapting the operating mode of the device to the selected defect type, it can be ensured that suitable conditions for the respective defect type exist when the photo is taken. The embodiments may be particularly advantageous for device components whose position, orientation and/or other parameters can be set and modified automatically, e.g. by means of a robotic arm or a vertical and/or horizontal transport rail used for moving the camera(s) and/or the light source(s), an automatic lift for changing the position of the sample, etc.

According to some embodiments, the device comprises multiple light sources. One or more first ones of the light sources are selectively activated when the device operates in a first operation mode. The first operation mode is specified via a first device setting. The first device setting is suited for taking a photo which allows detecting and/or quantifying a first type of coating defect. One or more second ones of the light sources are selectively activated when the device operates in a second operation. The second operation mode is specified via a second device setting. The second device setting is suited for taking a photo which allows detecting and/or quantifying a second type of coating defect. So if the first coating defect type is selected, only the one or more first light sources are activated and the second light sources are turned off. If the second coating defect type is selected, only the one or more second light sources are activated and the one or more first light sources are turned off.

This may have the advantage that it is not necessary to integrate motors and movable or rotatable parts for modifying the positions and/or orientations of the light sources: the light sources may already be attached to the inner side of the housing of the device such that subsets of the light sources are already positioned and oriented such that they are able to illuminate the coated surface in a way suitable for detecting one or more defect types.

According to embodiments, the method further comprises:

providing a configuration, the configuration comprising a plurality of assignments, each assignment assigning one out of a plurality of different coating defect types to one out of multiple device settings, each device setting determining one or more device configuration parameters which specify the position and/or mode of operation of one or more components of the device;

receiving, by the controller module, a selection of at least one of the coating defect types;

identifying, by the controller module, a device setting stored in the configuration in association with the selected coating defect type;

outputting, by the controller module, a message to a user, the message being indicative of how to modify the position, orientation and/or mode of operation of at least one component of the device in accordance with the identified device setting, the at least one component being selected from a group comprising a camera, a light source and/or of a sample carrier, the message enabling the user to manually or semiautomatically set the operation mode of the device to a defect-type specific image acquisition mode;

The acquisition of the digital image is performed while the device is in the defect-type specific image acquisition mode.

This embodiment may be advantageous because the device can be manufactured inexpensively and may be particularly robust: it is not necessary for individual components, such as the sample carrier or the light sources, to be equipped with motors or other means for automatic change of position or status. The required modifications are simply displayed so that the user can make the appropriate adjustments of various components of the device manually. Preferably, the manual adjustment means, such as knobs, rails, joints, etc., comprise markings or labels which allow the user to adjust the position, orientation and/or state of the respective component at discrete points.

For example, the sample carrier may be a manually adjustable lift, with a manually movable wheel allowing adjustment of the height of the lift. According to some examples, discrete markings are displayed on the wheel, for example, to indicate a predefined number (e.g. five) of different positions of the lift and corresponding heights. When the user selects a particular defect type, a controller module, which may, for example, be part of the device or running on a portable telecommunications device of the user, determines that the lift should have a predetermined position specifically assigned to the selected defect type. For example, the position of the lift can be stored in a configuration in association with the respective defect type. For example, the controller may determine that the lift should have the highest position "5" to bring the sample close to the camera. Via a GUI, the user is informed that the rotary wheel of the sample carrier must now be turned until one of the marks on the rotary wheel indicating the determined position (e.g. the "5" mark on the rotary wheel) has reached the target position.

According to embodiments, the device configuration parameters one or more of which may be adapted for changing the mode of operation of the device are selected from a group comprising:

the identity of each of one or more out of a plurality of light sources comprised in the device to be turned on; according to some examples, the light sources may comprise a light panel; the controller may be configured to turn the light panel on in case one of one or more predefined first defect types such as "translucency defect" was selected;

the identity of each of one or more out of a plurality of light sources comprised in the device to be turned off; according to some examples, the light sources may comprise a light panel; the controller may be configured to turn the light panel off in case one of one or more predefined second defect types such as "cratering defect" was selected;

the light intensity of each of one or more out of a plurality of light sources comprised in the device;

the position of each of one or more out of a plurality of light sources comprised in the device, in particular the height and/or horizontal offset to one or more of the walls of the housing of the respective light source;

the distance of each of one or more out of a plurality of light sources comprised in the device to the coated sample;

the illumination angle between each of one or more out of a plurality of light sources comprised in the device and the coated sample;

the position and/or height and/or tilt of a sample carrier within the device; The "tilt" of a sample carrier can, for example, be the tilt of a plate of the sample carrier, the plate being designed for carrying a sample placed onto the plate. For example, the sample carrier may comprise one or more joints that allow the plate to pivot in one or more directions. Preferably, the sample carrier is designed such that the pivoting is only possible to a limited number of preset tilting angles (angles of inclination of the sample carrier, in particular of the carrier plate).

the identity of each of one or more out of a plurality of device-internal cameras comprised in the device of claim 2, the device-internal camera to be used for image acquisition;

the identity of each of one or more out of a plurality of device-internal cameras comprised in the device of claim 2, the device-internal camera not to be used for image acquisition;

the position of each of one or more out of a plurality of device-internal cameras comprised in the device described herein for embodiments of the invention, in particular the height and/or horizontal offset to one or more of the walls of the housing of the respective camera;

the distance of each of one or more out of a plurality of cameras comprised in the device to the coated sample;

the image acquisition angle between each of one or more out of a plurality of cameras comprised in the device and the coated sample.

The use of a light panel may be advantageous in particular for identifying coating defects which have an impact on the degree of transparency (or translucency or opaqueness) or the uniformity of the distribution of the degree of transparency (or translucency or opaqueness) of the coated surface. For example, if the coating was applied by spraying from a spray nozzle and the nozzle has some defects or the coating composition comprises debris or other types of solid or semi-solid contaminants which may partially clog the nozzle, this may result in coating defect such as a too thick coating, a too thin coating or an inhomogeneous distribution of the amount of the coating applied to the surface. If too much of the coating is applied, a large proportion of the light emitted by the light panel will be absorbed by the coated surface and the degree of transparency (or translucency) indicated in the acquired image and determined by the image analysis software may fall below a predefined minimum transparency (translucency threshold). If an insufficient amount of the coating is applied, the degree of transparency (or translucency) indicated in the acquired image and determined by the image analysis software may exceed a predefined maximum transparency (translucency threshold). If the nozzle is clogged by contaminations comprised in the coating composition, the observed distribution of the transparency (translucency) in the coated surface may be inhomogeneous.

According to embodiments, one or more or even all of the above-mentioned components allow to adjust their respective configuration parameters to one out of a limited number of predefined parameter values. For example, a device component may include a mechanical control element such as a wheel or switch or an electronic interface that allows a user or a control module to set the parameter value to one out of a predefined number of allowed values. For example, a light source or a camera may allow being positioned at two, three, four, five or more predefined positions, etc. Also angles, light intensities, sample carrier heights etc. may preferably be set to one out of a predefined, limited number of possible values. This may ensure that the illumination conditions used for acquiring photos for a particular coating defect type of interest are comparable.

According to some embodiments, the device comprises a sample carrier configured for carrying a sample with the coated surface to be inspected, wherein the sample carrier is a sample carrier whose height and/or position inside the device can be adjusted manually or automatically. The device in some examples may further comprise a light panel placed on top of or integrated into the sample carrier.

The use of a light panel in combination with a height-adjustable sample carrier has been observed to be particularly advantageous for identifying coating defects associated with the application of an inappropriate amount of the coating composition (e.g. too much or too little of the coating composition or an irregularly distributed amount of the coating composition), because the light intensity captured by the camera is used for measuring the transparency (or translucency or opaqueness) of the coating, and the light intensity will also depend from the distance of the camera and the coated surface. By using a height-adjustable sample carrier in combination with the light panel may therefore provide for a particularly accurate identification and characterization of the said types of coating defects by the image analysis software. According to some examples, the light panel is placed on top of the sample carrier or is an integral part (e.g. the top plate) of the sample carrier.

According to embodiments, the device comprises a display configured to display a GUI generated by the controller module. For example, the display can be an LCD display or an OLED display integrated into or attached to the housing of the device.

According to other embodiments, the device comprises and/or is operatively coupled to a portable telecommunication device. For example, the device may comprise a near field communication interface such as a Bluetooth interface, or a network interface for exchanging data with the tele-communication device via a network, e.g. the Internet. The portable telecommunication device comprises the controller module. For example, the controller module can be implemented in the form of an application program, in particular a so called "app". The portable telecommunication device comprises a display and the controller module may be configured to generate a GUI.

The GUI shown via a display of the device and/or via a display of the portable telecommunication device may enable a user to select one or more defect types of interest, for controlling the mode of operation of the device and/or of individual components of the device and/or for displaying a result of the detection and/or quantification of one or more coating defects.

According to embodiments, the device comprises an interface for exporting acquired photos of the coated sample. For example, the export interface can be the above-mentioned near field communication interface or a network interface or another interface, e.g. an USB interface or a chip card interface.

According to embodiments, the inspection of the photo is performed by an image analysis software. The image analysis software can be executed on a data processing unit being an integral part of the device. In addition, or alternatively, the image analysis software can be run on the portable telecommunication device, a personal computer, or on a server operatively coupled to the portable telecommunication device or the personal computer. According to some embodiments, the controller module and the image analysis software is part of the same monolithic software (standalone software application) or is part of a distributed software framework.

According to embodiments, the method further comprises generating, by the controller module, a graphical user interface—GUI. The GUI is configured to display a plurality of selectable GUI elements respectively representing one of the plurality of different coating defect types. The controller module receives the selection of the at least one of the coating defect types in the form of a selection of a respective one of the GUI elements by the user.

This may be advantageous as a highly flexible method and system is provided which enables a user to select the defect type(s) of interest via a GUI. The selection may, for example, trigger the automated adjustment of the mode of operation of the device and/or the display of required manual control steps in order to adjust the mode of operation of the device such that a photo can be taken under conditions suitable for detecting the selected defect type(s).

According to embodiments, the method comprises: using at least one camera for acquiring a digital preview image, the preview image depicting the coated surface; and performing, by the controller module, an initial image analysis of the preview image for identifying at least one type of coating defects depicted in the preview image. The at least one selected coating defect type is the at least one type of coating defects identified in the initial image analysis.

For example, the preview image can be captured in a preview mode of the device. Its main and typically sole purpose is to allow determining, in a first rough automatic or manual image analysis step, which defect types are present at all on the coated surface or are present at least with a certain minimum probability. The preview mode is preferably one that allows the detection of the presence of as many different defect types as possible. According to embodiments, the list of (probable) defect types determined in the preview step is displayed to the user for selection of one or more defect types or is used for automatically setting the mode of operation of the device to a sequence of modes respectively suitable to acquire a photo which allows detecting and/or quantifying the respective defect type.

According to one embodiment, upon receiving a selection of multiple defect types, the controller module causes the device to enter a sequence of multiple operating modes, wherein in each mode a photo of the coated surface is taken for subsequent inspection by a human or one or more image analysis algorithms.

According to embodiments, the inspection of the photo is performed by an image analysis software and comprises obtaining a qualitative and/or quantitative characterization of the coating defects in the coated surface. The step of obtaining a qualitative and/or quantitative characterization of the coating defects in the coated surface may be performed for one or more defect types of interest separately, e.g. in a parallel or sequential manner. The method further comprises outputting, by the image analysis software, a result of the image analysis.

According to embodiments, the device comprises multiple light sources. Preferably, one of the multiple light sources is a light panel. The light panel can be permanently installed in the device or can simply be inserted into the device in such a way that it can be removed at any time. For example, the light panel can be placed on the bottom of the device or on a carrier plate of a sample carrier. Preferably, the device can have an opening for the power line of the light panel that is approximately large enough for a power cable to fit through, so that on the one hand the cable is not squeezed and on the other hand the penetration of too much stray light is avoided.

The light panel represents a sample support plate of a sample carrier or is a light panel having been placed on top of the sample carrier. The light panel serves as a transmission light source for emitting light which passes the coated surface before being acquired by a camera for creating the photo.

This embodiments may be particularly advantageous for detecting coating defects in coatings where differences in coating thickness are considered particularly objectionable. For example, this is the case with coatings applied to transparent surfaces, or with protective coatings that must ensure a certain minimum thickness throughout the coating to provide a protective effect. Preferably, the sample coated with the surface coating is a transparent sample, e.g. a glass slide.

For example, a light panel can be a light source having the form of a flat sheet of material. Preferably, a light panel has a size larger than the size of a sample which may be placed on top of the light panel. This may ensure that all regions of the coated sample surface are illuminated by the light of a light panel homogeneously. For example, a light panel may have a square or rectangular shape with each side of the light panel being e.g. in the range of 5 cm to 40 cm, e.g. 5 cm to 20 cm. The light panel can be an LED light panel.

According to embodiments, the at least one light source comprises a plurality of light sources.

According to some embodiments, each of at least a subset of the light sources can be controlled individually with respect to turned-on state, turned-off state and/or light intensity. This means that a controller module may be configured to individually turn on or off each light source of the subset individually and/or may be configured to set the brightness of the light source individually, e.g. in accordance with a select defect-type specific operation mode of the device.

This can have the advantage that different illumination conditions can be set to detect different coating defects without the need to change the position or orientation of the coated surface and/or the camera. Switching on or off different light sources or increasing or decreasing the brightness of some light sources may already be sufficient for this. On the one hand, this allows switching back and forth between the device operating modes in a shorter time, since no movement of samples or mechanical device components is required. The time for acquiring images for different defect types under different conditions can thus be accelerated considerably. In addition, in some cases it may not be necessary to equip the device with movable parts, making the device mechanically robust and particularly suitable for mobile use.

According to some embodiments, at least one of the light sources is a ring-shaped illumination source. This may have the advantage that the coated surface may be illuminated more homogeneously.

According to some embodiments, at least one of the light sources is configured to allow to adjust the size of the light cone to a limited number of predefined shapes. For example, a light source may include a wheel or switch or an electronic interface that allows the beams emitted by the light source to be focused to a greater or lesser degree on a point. For example, two, three, four, five or more predefined, selectable light cone shapes may be supported by the light source.

According to embodiments, the device is a single component and/or is a portable device. A portable device preferably has a weight of less than 30 kg, preferably less than 20 kg, or less than 10 kg, and preferably has dimensions and holding devices that allow a human to move the box at least within a short range of 3-4 meters.

According to embodiments, the inspection of the photo for the presence of the surface defect comprising identifying and/or quantifying one or more coating defect types. The coating defect types are selected from a group comprising: a cratering defect, an abrasion defect, an adhesion failure defect, an alligatoring defect, a bleeding defect, a blistering defect, a bloom defect, a bridging defect, a bubbling defect, a cathodic disbanding defect, a checking defect, a cissing defect, a cobwebbing defect, a cracking defect, a crazing defect, a crowsfooting defect, a delamination defect, a fading defect, a flaking defect, a grinning defect, a heat defect, an impact defect, an intercoat contamination defect, a mud cracking defect, an orange peeling defect, a peeling defect, a pinholes defect, a rippled coating defect, a runs defect, a rust rashing defect, a rust spotting defect, a rust staining defect, a sags defect, a settlement defect, a skinning defect, a solvent lifting defect, a solvent popping defect, a stress cracking defect, an undercutting defect, a wrinkling defect.

According to embodiments, the device is used for acquiring a plurality of photos of a plurality of coated surfaces. The method further comprises:

storing the acquired photos as digital images in association with image labels in a storage medium, the image labels being indicative of the position and type of one or more surface defects of one or more different coting defect types; and inputting the acquired digital images and their associated labels into a machine learning program configured to perform a machine learning method for learning associations between image features of the acquired digital images and the type and/or amount of image defect indicated in the labels, the learned associations being stored as trained predictive model;

integrating the predictive model in an image analysis software configured to perform a qualitative and/or quantitative characterization of defects in a coated surface of a sample depicted in a digital image provided as input.

This can be beneficial as it may improve the quality of the training dataset and thus the accuracy of the predictive model: the training images were all taken under defined photographic conditions favorable for identifying and characterizing the particular defect type annotated. The number of training images required for achieving a required minimum coating defect identification and/or quantification accuracy (and hence also the amount of required storage space, time and CPU capacity for the training) may be reduced.

According to embodiments, the inspection of the photo is performed by an image analysis software which comprises the predictive model, whereby the coating-defect type specific mode of operation of the device when used for acquiring the photo of the coated surface is identical to the coating-defect type specific mode of operation of the device used for acquiring the training images for the predictive model in the image analysis software. This may ensure that the illumination conditions when taking the photo of the coated surface to be examine are identical or at least highly similar to the illumination conditions when taking the photos used as the training data of the model of the image analysis system.

The device and device and/or the system described herein can be used for acquiring images to be analyzed for characterizing the quality of the coating composition and/or the quality of the coating process as described e.g. in the three European Patent applications with application numbers 20 196 660.3, 21 196 972.0 and 21 196 973.8 which are incorporated by reference in their entirety. The images can be annotated and be used as training image for creating an image analysis software configured for identifying and/or characterizing coating defects as specified in the above-mentioned three European patent applications.

In a further aspect, the invention relates to a device configured to create an enclosed space to isolate a surface coating from ambient illumination in order to provide predefined photographic acquisition conditions within the enclosed space. The device comprises:

a housing being non-transmissive to light, and/or one or more light sources, and/or at least one device-internal camera inside the housing and/or a camera housing opening for enabling at least one device-external camera to capture an image of the sample through the camera housing opening;

and optionally also a sample carrier for carrying a coated sample, and/or a coated-surface-opening, wherein the coated-surface-opening is an opening within a wall of the housing referred to as contacting wall, the contacting wall being intended for planar contacting of the coated surface, and/or a sample-position marking, wherein the marking indicates a position inside the device where a sample with the coated surface is to be placed.

In a further aspect, the invention relates to a system comprising the device as described herein for embodiments of the invention and comprising:

a controller module configured to control the operation of the device; and/or a configuration, the configuration comprising a plurality of assignments, each assignment assigning one out of a plurality of different coating defect types to one out of multiple device settings, each device setting determining one or more device configuration parameters which specify the position and/or mode of operation of one or more components of the device; and/or a computer system operatively coupled to the controller module, the computer system comprising an image analysis software configured to perform an image analysis to identify and/or quantify one or more coating defect types in the coated surface depicted in the photo, the computer system being in particular a server computer or a portable telecommunication device.

The embodiments and examples described herein are to be understood as illustrative examples of the invention. Further embodiments of the invention are envisaged. Although the invention has been described by way of example to a specific combination and distribution of software programs and computer systems, it is to be understood that any feature described in relation to any one embodiment may be used alone, or in combination with other features described, and may also be used in combination with one or more features of any other of the embodiments, or any combination of any other of the embodiments as long as these features are not mutually exclusive.

A "photo" (also known as a "image", or "picture") is an image created by light falling on a photosensitive surface, usually photographic film or an electronic image sensor, such as a CCD or a CMOS chip. A photo can be created using a camera, which uses a lens to focus the scene's visible wavelengths of light into a reproduction of what the human eye would see. A photo can be a digital image or an analog, hard copy image, e.g. a printout.

A "device" as used herein is physical hardware or equipment designed for a specific purpose. For example, the purpose can be the provision of an enclosed space to isolate a surface coating to be inspected from ambient illumination and can be the provision of a predefined photographic acquisition conditions within the enclosed space. The device may comprise one or more components such as cameras or light sources which may contribute to providing the predefined photographic acquisition conditions. The device may comprise a housing allowing to attach various components (cameras, light sources, sample carrier, handles for carrying the device) to the inside or the outside of the housing. The device may be a single-unit hardware or equipment. A device can be, for example, a single piece or a combination of multiple pieces of opaque material adapted and shaped to create an enclosed space to isolate a surface coating to be inspected from ambient illumination and for providing predefined photographic acquisition conditions within the enclosed space. In some embodiments, the device may provide a basically total isolation from ambient illumination. In other embodiments, the device allows a certain amount of stray light. For example, it has been observed that a small amount of stray light that may enter through small light slits in the camera housing opening when an external camera is placed over the camera housing opening is generally harmless, especially if the intensity of the internal light sources is high enough so that the stray light is negligible relative to the intensity of the light sources.

A "housing" as used herein is a single-piece or multi-piece material or material combination forming the exterior wall of a device. The housing may have the shape of a cuboid, a cylinder, a cube, or any other 3D shape. Preferably, the housing comprises at least one basically planar wall to allow to contact this wall with a planar coated surface or to stably place a coated sample onto the inner side of the planar wall. The housing may form and enclose a cavity and may comprise one or more openings which can be closed to shield the cavity from the ambient light. The cavity can also be formed by a combination of the housing and one or more further objects. The further object can e.g. be a portable telecommunication device, e.g. a smartphone, which is placed onto an opening of the housing such that the ambient light is basically prevented from entering the cavity via the opening.

According to some embodiments, the housing may comprise or completely consist of rigid material such as plastic, wood, plywood, metal, fiberglass, or composite material. Some parts of the housing may also be made of a flexible material. For example, some parts of one or more walls of the housing may comprise or consist of flexible materials such as textile, flexible polymer foil, etc. This may help to reduce the weight of the device.

According to some embodiments, the device comprises a frame and a cover and uses the frame and the cover to isolate the coated surface from ambient light. A "cover" as used herein is a flexible, sheet-like, opaque material, e.g., a textile, a fiber mesh, a flexible polymer foil, etc. stretched or draped over the frame to form the enclosed space.

A "camera" as used herein is an optical instrument that captures a visual image. At a basic level, cameras consist of sealed boxes (the camera body), with a small hole (the aperture) that allows light through to capture an image on a light-sensitive surface (usually photographic film or a digital sensor).

A "controller module" as used herein is a piece of software, firmware or hardware or a combination thereof which is configured to control the operation of another object, e.g. a device and/or a device.

A "coated surface" as used herein is a surface of a substrate having been coated at least partially one or multiple times with a coating composition. For example, the coating composition can be applied by spreading or spraying or painting the coating composition onto the substrate, by immersing at least one surface of the substrate in the coating composition, or by other coating approaches. The substrate may be of any material, e.g. wood, glass, metal, plastic, etc. The substrate may be, for example, a sample or a workpiece.

A "sample" as used herein is a specimen of a material. A sample is typically of small size such that it can be placed completely into a confined space formed by the device. In particular, the sample can be a piece of material coated for the purpose of evaluating the quality of a coating composition and/or of a coating process.

A "coating defect" or "coated surface defect" as used herein is any optically detectable deviation of a coated surface from a typical or desired appearance of the coated surface. In particular, a coating defect may be the result of bubbles, of cracks created during a drying process, of an inhomogeneous distribution of the amount of coating material on the surface or of an inhomogeneous distribution of individual components within the coating, etc.

A "program" as used herein is a piece of software, e.g. an application program or a module or function of an application program, or a script, or any other kind of software code that is executable by one or more processors, e.g. CPUs or GPUs. A program can be, for example, an application program. Application programs, in particular programs designed for execution on portable devices, can be implemented in the form of an "app".

An "image analysis software" for inspecting a coated surface for a surface defect as used herein is a software program or software module configured to analyze digital images for automatically identifying the identity and/or position and/or amount of one or more coating defects of one or more coating defect types. The image analysis software may also be configured to compute a coating quality report as a function of the identified coating defects in the surface depicted in the image.

A "model" or "predictive model" as used herein is a data structure or executable software program or program module configured to generate a prediction as a function of input data. For example, the model can be a model obtained in a machine-learning process by training the model on manually and/or automatically annotated training data. A predictive model as used herein may also comprise a collection of two or more predictive models, e.g. a set of multiple defect-type specific predictive models.

BRIEF DESCRIPTION OF THE DRAWINGS

In the following embodiments of the invention are explained in greater detail, by way of example only, making reference to the drawings in which.

DETAILED DESCRIPTION

Figure 1:
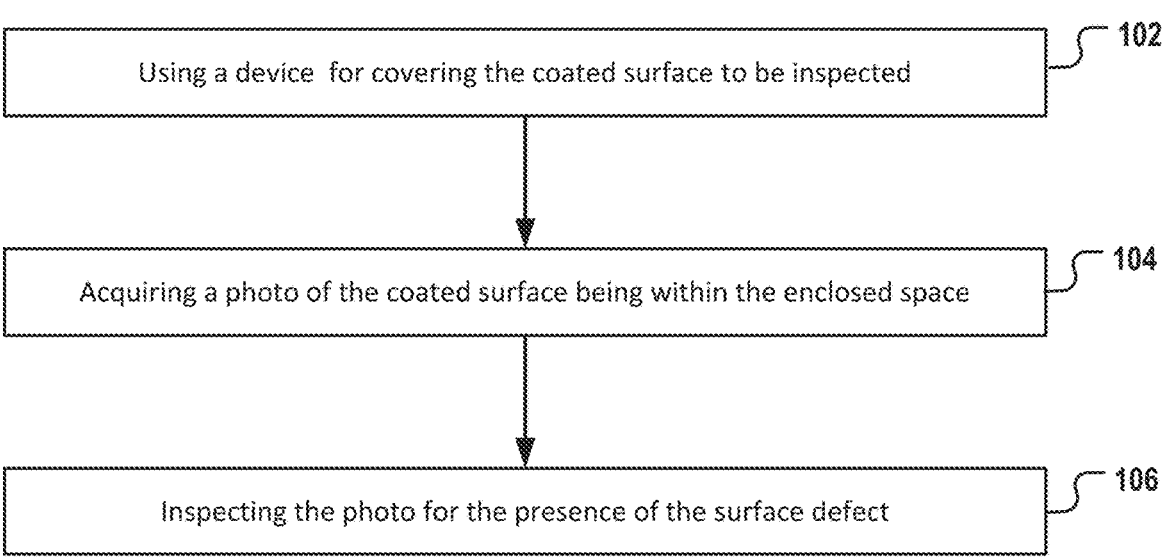
FIG. 1 is a flow chart of a method for inspecting a coated surface.

FIG. 1 is a flow chart of a method for inspecting a coated surface 204. The method may be performed by a device or device described herein for embodiments of the invention, e.g. by the devices and devices depicted in FIGS. 2-4 and 7-9. The method comprises a first step 102 of using a device 200, 300, 400, 700, 800, 900 for covering the coated surface to be inspected. The device creates an enclosed space to isolate the surface coating to be inspected from ambient illumination and provides predefined and preferably defect-type specific photographic acquisition conditions within the enclosed space. Next in step 104, the device is used for acquiring a photo of the coated surface. The photo can be a digital image or a hard-copy photo, e.g. a paper-based printout. Next in step 106, the photo is inspected manually or automatically by means of an image analysis software for detecting the presence of the surface defect.

Figure 2:
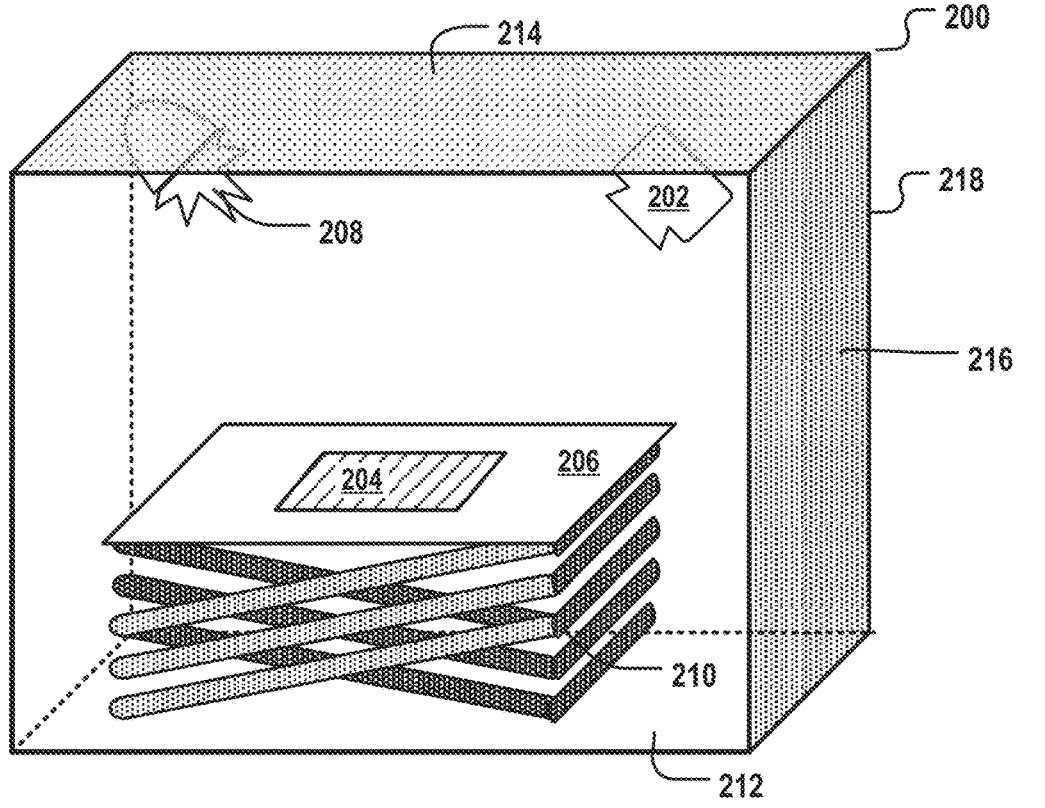
FIG. 2 depicts a device for covering a coated surface according to one embodiment.

FIG. 2 depicts a device 200 for covering a coated surface according to one embodiment of the invention.

The device shown in FIG. 2 is a cuboid device with a housing 218 encompassing six walls. The housing of the device can be made of any material which is substantially opaque to light, e.g. cardboard, plastic, textile, metal, a composite material or combination of materials. The device includes at least one opening for inserting the coated sample 204 into the device. The opening may be implemented as a door or flap, for example, and is not shown in FIG. 2. According to embodiments, the inner walls of the device have a dark color, e.g. black, for minimizing reflections.

Thus, the enclosed space to isolate the surface coating from ambient illumination may be provided by the housing of the device. The predefined photographic acquisition conditions may be provided by the housing and the one or more illumination sources and one or more cameras having a predefined position and/or orientation. The device may include various components that may be attached to, for example, the inside of the ceiling 214 or a side wall 216 of the housing 218. For example, the components may include one or more light sources 208, for example LEDs. Additionally, the components may include at least one device-internal camera 202. A lifting platform, also referred to as "lift" 210, is positioned on the floor 212 of the device 200. The lifting platform includes a support plate 206 that can be moved vertically up or down. For example, manually operable or automated actuators such as wheels or a motor may be used for this purpose. According to some embodiments, the components and/or the device 200 include means for manually or automatically adjusting the positions and/or orientations of the light sources and/or the camera, preferably including the ability to adjust discrete positions or angles.

The support plate 206 allows a sample 204 having a coated surface to be placed on the support plate 206, such that it is possible to position the coated surface at a defined position relative to the camera 202 and/or relative to the one or more light sources 208. When the opening for inserting the sample 204 is closed, the housing of the device forms the device that protects against ambient light penetration.

Figure 3:
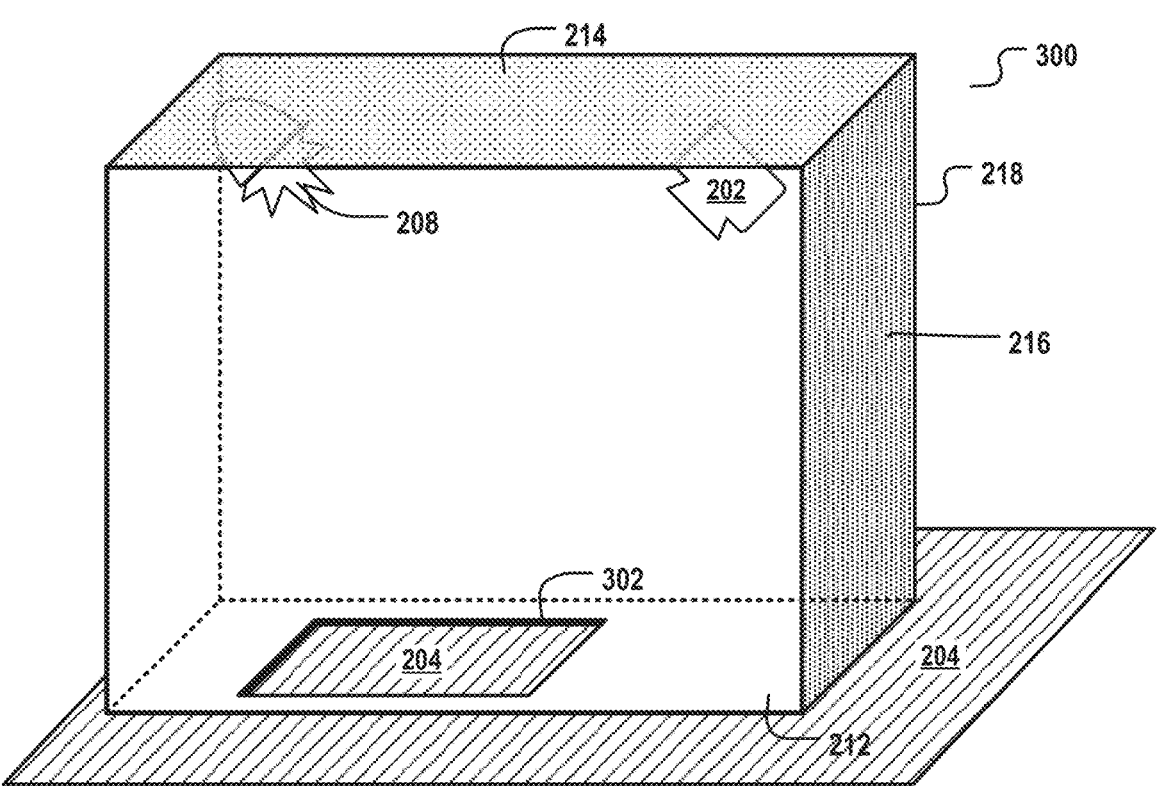
FIG. 3 depicts a device for covering a coated surface according to another embodiment.

FIG. 3 depicts a device 300 for covering a coated surface 204 according to another embodiment. The enclosed space is formed by the housing 218 of a device which includes an opening 302 that is not closed during the capturing of the photograph. Preferably, the opening 302 is located on a side 202 of the housing, in the illustrated example the bottom side, which is configured to contact the coated surface of a sample or other substrate, e.g. a surface of a coated workpiece. For this purpose, the surface 212, also referred to as the contact surface, can be formed at least in part as a flat surface that allows the contact surface 212 to make planar contact with the coated surface 204 so that ambient light penetration through the opening 302 is substantially prevented. For example, the device 300 shown in FIG. 3 can be placed on a horizontal surface, which has the advantage that the device will remain stable in its position without the need for further fastening means in order to take the photograph.

However, it is also possible for the device to be rotated 900 so that the opening 302 faces sideways and can be brought into contact with a vertical surface, e.g. by pressing the device against the coated surface.

According to embodiments, fastening means such as, for example, hooks, suction cups, Velcro fasteners or the like may be attached to the device adapted to stably and reversibly attach the device 300 to the vertically oriented surface at least for a time until the photo could be taken, preferably without damaging the coated surface. For example, the device may be provided with suction cups to attach it to smooth surfaces such as coated automotive doors or window panes.

According to some embodiments, the opening 302 is provided with a closure device, e.g. a door. The closing device allows to transfer coated samples smaller than the housing of the device, and optionally also a sample carrier, into the device. In this case, the closing device ensures that no light can penetrate through the opening 302. Thus, such a device can be used both to be brought in contact with a larger coated surface to take a photo of the coated surface via the opening 302, and to take a photo of the coated surface of a small sample transferred into the device. For example, the sample transferred into the device may be placed on a lift 210 as depicted in FIG. 2 or may be placed on the bottom side 212 of the device. This dual-use device may have the advantage of being usable for both for inspecting coating defects on small samples while creating and optimizing a coating formulation and for inspecting coating defects of large workpieces, whereby it is possible to acquire photos under conditions/modes of operation which are optimal or at least suited for inspecting one or more coating defect types of interest.

Figure 4:
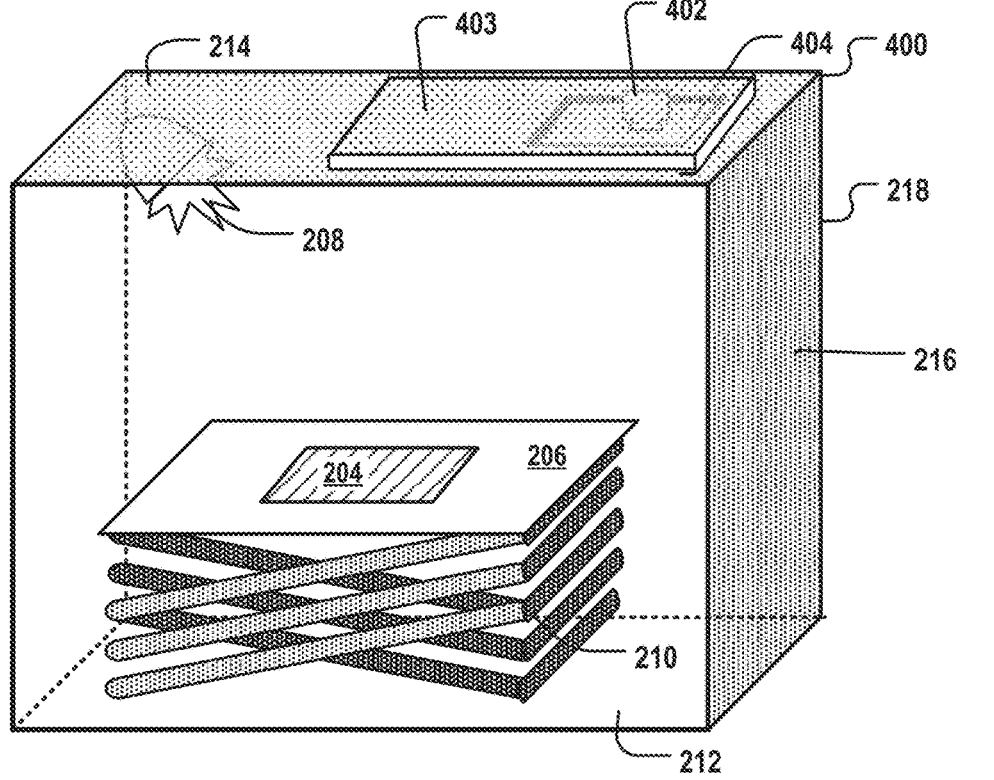
FIG. 4 depicts a device for covering a coated surface according to a further embodiment.

FIG. 4 depicts a device for covering a coated surface according to a further embodiment. The enclosed space is formed by a combination of the housing 218 of the device 400 and a portable telecommunication device 403 placed over a camera housing opening 404 such that basically no ambient light can enter the interior of the housing.

The device 400 shown in FIG. 4 can be, for example, substantially the same as the device shown in FIG. 2. In addition or as an alternative to the device-internal camera 204, the device 400 includes a camera housing opening 404. The camera housing opening is a permanently open or closable opening within a wall of the housing 218 of the device 400. Preferably, the wall that includes the camera housing opening 404 is a wall opposite the coated surface 204, for example, the ceiling 214 of the device.

Preferably, the telecommunication device 403 is oriented and positioned such that its camera 402 can make a photo through the camera housing opening 404 when the telecommunications device 403 is placed on the exterior surface of the wall 214.

Instead of the camera of a telecommunication device, a document camera can likewise be used as the device-external camera. Preferably, the document camera has a camera arm that is adjustable in height and/or that allows the orientation of the camera to be changed. Preferably, the camera housing opening 404 of the device is smaller than the component of the document camera that contains the camera lens so that the camera housing opening is substantially completely covered when the camera lens of the document camera is positioned directly above the camera housing opening to take a photo of the interior of the device. Preferably, the document camera supports a set of predefined, distinct, positions and/or orientations of the document camera, in particular the part of the document camera comprising the camera lens.

In some embodiments, the device 400 may include fastening means, for example, indentations, elevations, rails, Velcro, buckles, magnets, etc., configured to hold the telecommunication device 403 in place and/or configured to facilitate a user's proper positioning of the telecommunication device over the opening 404 so that the camera 402 is directed towards the interior of the device 400 and can capture an image of the coated surface 204.

According to further embodiments, any combination of the individual components of the devices and devices shown in FIGS. 2,3 and 4 is possible. For example, the device shown in FIG. 4 may have a coated-surface-opening 302 as shown in FIG. 3 instead of the lift 210. There may be one or more light sources in a permanent/unchangeable or changeable position or orientation. In addition or as an alternative to the option of placing a camera 402 of a telecommunication device over the camera housing opening 404, the device 400 may also include one or more integrated cameras (not shown) that can, for example, capture images of the coated surface 204 at a particular image capture angle that is not achievable by the camera 402 of the telecommunications device 403.

Figure 5:
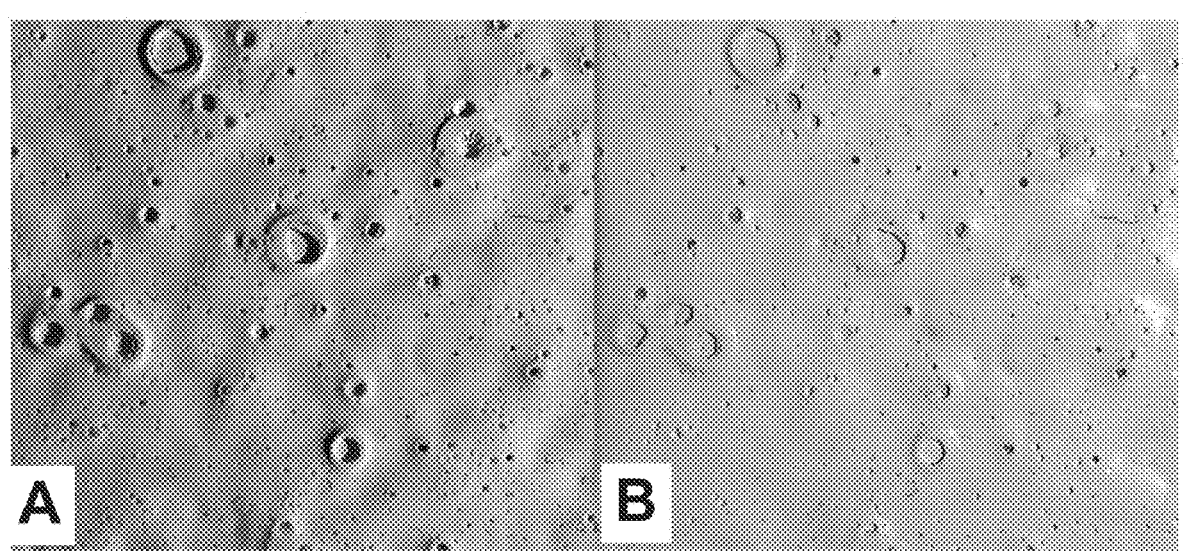
FIG. 5 shows two photos of the same surface acquired at different environmental parameters.

FIGS. 5A and 5B respectively show a photo of the same coated surface, whereby the two photos were acquired at different environmental parameters. A comparison of the photo A (acquired using a flat illumination angle of about 20°-50°) and the photo B (acquired using a steep illumination angle of about 80°-110°) shows that the visibility of the depicted defects, here a foam defect, depends on the photographic conditions.

Figure 6:
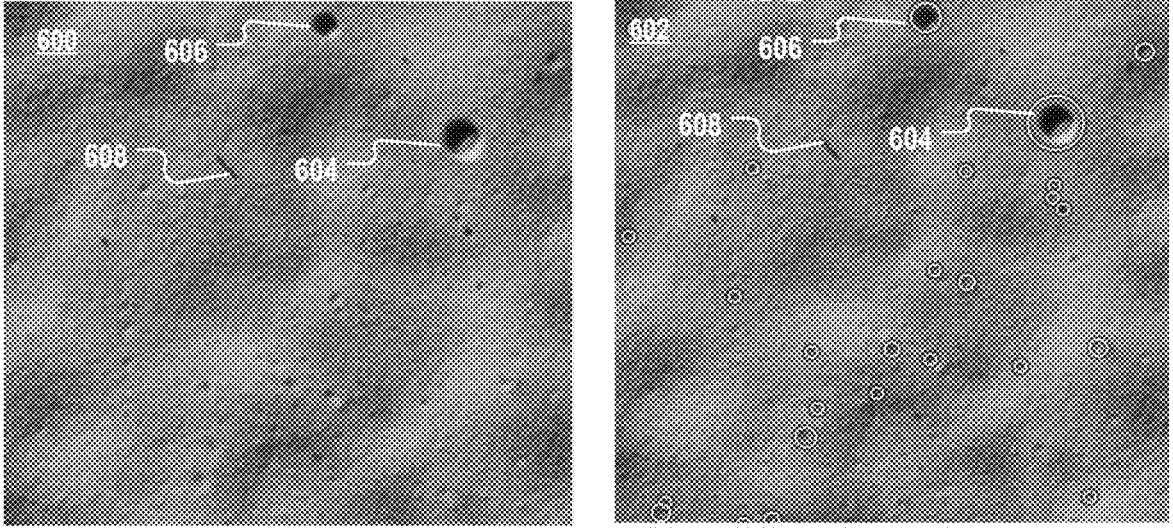
FIG. 6 two photos of the same surface, one photo comprising labels indicative of surface defects.

FIG. 6 two photos of the same surface, one photo comprising labels indicative of surface defects. Photo 600 shows a photo of a coated surface before manual annotation (label assignment) of the defects. The digital image 600 shows a coated surface containing foam defects. The coated surface comprises two major defects (holes), and several smaller defects (small holes). In addition to the defects, the digital image comprises an artifact 608 which can be caused by a dust speckle on one of the lenses of the image acquisition system or on the substrate.

As the substrate was illuminated from the side, the defects are clearly recognizable due to the shadow formation. The shadow formation allows the identification and differentiation of elevations and depressions of the coating on the substrate. In addition, the shadow formation can be used to judge whether, for example, in the case of a depression, there is a sharp edge, or the coating thickness is slowly decreasing. This may allow discerning bubble defects from cratering defects.

Photo 602 shows the photo 600 whose bubble defects have been manually labeled (annotated) by circles surrounding the respective defect. Annotating a digital image may comprise storing the digital image in association with information being indicative of the position and type of the coating defects depicted in the image. Optionally, the labels may comprise additional data such as the mode of operation of the device used for obtaining the image and/or associated parameters such as image resolution, light intensity, illumination angle etc. which may allow determining quantitative defect measures such as diameter, circumference, or the like. For example, the defects can be marked with the software VIA-VGG Image Annotator (Abhishek Dutta and Andrew Zisserman, 2019, "The VIA annotation software for images, audio and video", Proceedings of the 27th ACM International Conference on Multimedia (MM '19), Oct. 21-25, 2019, Nice, France. ACM, New York, NY, USA, 4 pages. https://doi.org/10.1145/3343031.3350535.).

Figure 7:
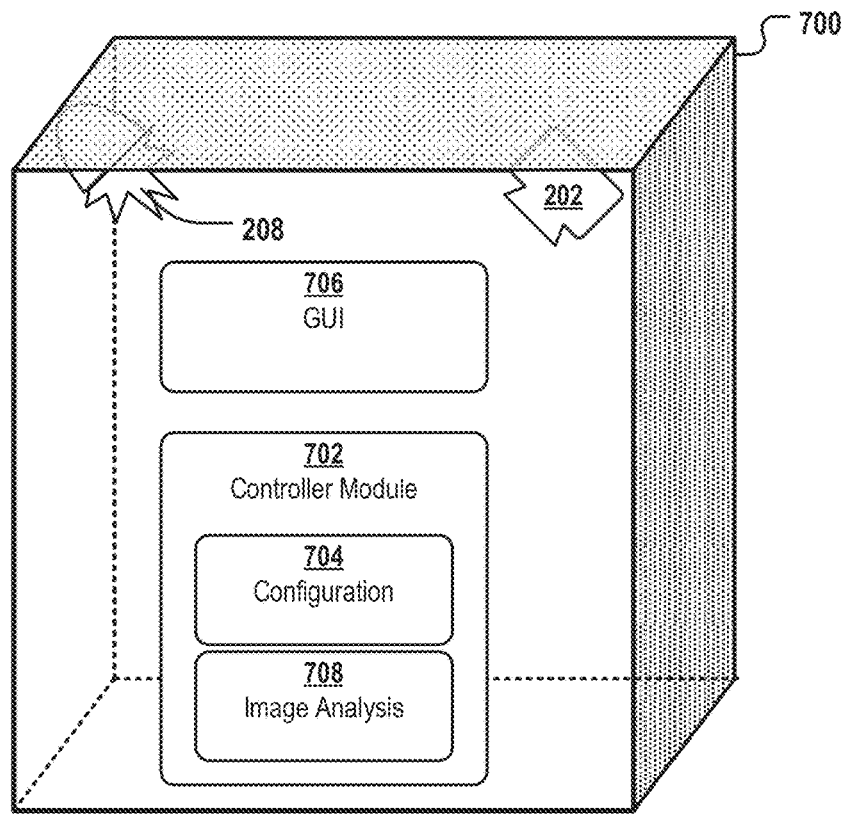
FIG. 7 depicts a device for covering a coated surface according to one embodiment.

FIG. 7 depicts a device 700 for covering a coated surface 204 according to one embodiment. For example, the device 700 may be configured as described for embodiments or examples of the invention with respect to the devices and devices shown in FIGS. 2-4. For example, the device 700 may be operatively coupled to a controller module 702. For example, the controller module 702 may be executed on a data processing system, for example a computer, e.g., a single board computer, wherein the data processing system is an integral part of the device 700. However, according to other embodiments, described for example in FIG. 8, the controller module may also be part of an external data processing system communicatively connected to the device 700. For example, the controller module 702 may include a configuration 704 in the form of one or more configuration files or other data structures. The configuration 704 includes a plurality of assignments. Each assignment assigns a device configuration to one of a plurality of predefined coating defect types. Each device configuration includes one or more parameter values that specify a state of one or more device components, such as cameras, light sources, lift height, etc. The states can be, for example, the positions, orientations, heights, and/or light intensities of components of the device or device, or the optical or physical zoom of a camera, or a specification of the type and number of spectral filters for individual cameras, etc. Setting the mode of operation of the device 700 to a particular mode may comprise modifying the position, orientation or other properties of the device components such that the values of these properties comply to the values or value ranges specified in the configuration for a particular defect type.

According to the embodiment shown in FIG. 7, the controller module 702 is configured to generate a graphical user interface 706. For example, the GUI 706 may be generated such that the controller module 702 first accesses the configuration 704 to identify the list of supported defect types. For each of the supported defect types, a selectable GUI element, for example, a checkbox, is generated. Each selectable GUI element allows a user to select one or more defect types that are of particular interest to the user. The controller module is configured to receive the user's selection and, using configuration 704, read out one or more device configurations associated with each of the selected defect types. For each of the selected defect types, the controller module 702 then causes the device 700 and its components to enter an operating mode specified in the device configuration of said defect type. This mode of operation implies creating a photography environment within the device 700 that is suitable for acquiring photos which allow accurate detection and/or quantification of the corresponding defect type.

According to some embodiments, the controller module 702 also includes or is operatively coupled to image analysis software 708. This may have the advantage that the device does not rely on its network connection to an external device or server being available. In some buildings or portions of buildings, a cellular connection or other reliable communication link may not be available for security reasons or due to the nature of the building's construction. In addition, using a cellular connection to send captured images over the network to the image analysis software and receive the results can cause significant delays. Therefore, in application scenarios in which a highly reliable and/or rapid output of an analysis result regarding the identity and/or quantity of defects present on a coated surface is desired, a fully integrated solution such as that shown in FIG. 7 may be advantageous. For example, the image analysis software 708 may analyze one or more photos provided as digital images to determine the presence and/or quantity of a given defect type. Quantifying a defect may comprise determining a percentage of the captured photo affected by the defect and/or determining a number of particular individual defects (scratches, bubbles) per unit of image area.

For example, the images captured by a camera of the device 700 may be stored in a data store inside of (or in some embodiments, external to) the device. The photos may be stored in association with an ID of the mode of operation and/or one or more device parameters set when the device is in a given mode of operation. The image analysis software may use the ID or device parameter(s) of the mode of operation during image analysis to determine whether a particular photo was captured during a mode of operation that allows for reliable detection and/or quantification of a particular defect type. If the mode of operation set while acquiring the photo does not allow such detection and/or quantification of a particular defect type, the photo in question is not used as a basis for detecting that defect type. Preferably, if the user selects multiple defect types, each requiring multiple different modes of operations, then multiple photos are taken of the same coated surface so that for each defect type of interest to the user, there is at least one photo that can be provided as input to the image analysis software.

According to one embodiment, at least one photo is taken for each supported mode of operation of the device 700. This may have the advantage that for all supported coating defects a suitable photo exists and can be used as input for the analysis. However, according to another embodiment, only those operating modes are set (manually or automatically using the controller module 702) that a user has previously selected. This may have the advantage that only those defect types that are actually of interest to the user trigger the device to enter a particular operation mode. This can significantly reduce the time required to take the images to be analyzed, and also save storage space.

According to one embodiment, the controller module 702 includes an export interface for exporting the photos taken by the one or more cameras 202,204.

Figure 8:
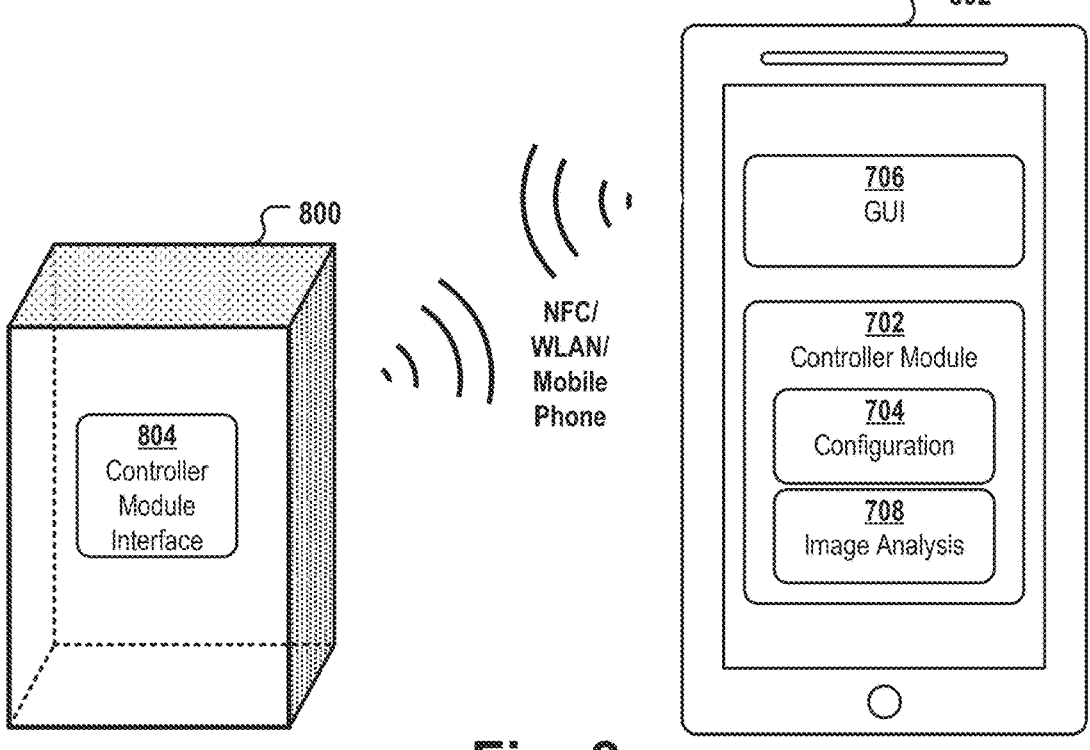
FIG. 8 depicts a system comprising a device and a telecommunication device.

FIG. 8 depicts a system comprising a device 800 and a portable telecommunication device 802. For example, the portable telecommunications device 802 may be a notebook computer, a tablet computer, or a mobile phone, particularly a smartphone. A controller module 702 may be installed on the telecommunications device, for example as a software application, and may include substantially the functionalities described with respect to FIG. 7. For example, the telecommunication device and/or the controller module 7 installed thereon may be configured to generate a graphical user interface 706 through which the user may select one or more defect types and/or through which the user may output the results of an automatic inspection of the images captured by the device 800 using one or more defect type-specific image analysis algorithms. According to some embodiments, the controller module includes image analysis software 708 having one or more defect type-specific image analysis algorithms. However, it is also possible that the image analysis software is not installed on the telecommunications device 802, but is installed on another computer system communicatively connected to the telecommunication device 802.

According to some embodiments, the telecommunication device 802 includes a configuration 704 and a controller module 702, wherein the controller module is configured to use the configuration to set the mode of operation of the device 800 or to switch between different modes of operation depending on the types of defects that a user wishes to determine. For example, the device 800 may include data processing system, for example, a computer, for example, a single board computer, on which software or firmware 804 is executed that is interoperable with the controller module 702. For example, the interface 804 may be used to transmit photographs captured by the device 800 in the form of digital in images to the controller module 702 and/or to receive control commands for setting the mode of operation of the device 800 from the controller module 702.

For example, the interface 804 and the telecommunication device 802 may be formed via an interface to near field communication such as Bluetooth. However, it is also possible for the interface 802 and the telecommunication device 804 to communicate via an Internet connection, such as cable bound and/or WLAN based connection.

For example, a device or device may support the following modes of operations and respective device settings to achieve good detection results for cratering defects, micro foam defects and macrofoam defects and the controller module may control the switching of the device to different modes of operation or may generate an output which may guide the user to change the mode of operation of the device or one or more of its components:

A: Crater and incompatibility detection: a coated glass plate is placed on a light table positioned on top of a lift; the camera position and/or the height of the lift is adjusted such that the distance between camera and sample is approx. 7.5 cm. One or more photos are taken. The craters and incompatibilities are detected as bright areas in the photo(s).

B: Micro foam detection: the position of one or more light sources and/or the position of the sample and/or position of the camera are adjusted such that the coated sample is illuminated at a flat angle from the side and such that the distance between camera and sample approx. 7.5 cm. One or more photos are taken. The foam bubbles are detected by the formation of shadows due to the oblique incidence of light.

C: Macro foam detection: As for micro foam detection, but the distance between camera and specimen is and sample is set to approx. 17 cm. The different distances for micro and macro foam detection ensure that the small micro foam bubbles are visible in a sufficiently high resolution on the photo and to ensure that a large area of the sample is analyzed during macrofoam detection, in order to detect any isolated bubbles.

The above distance specifications may vary depending on the camera and optics comprised in the respective device.

Figure 9:
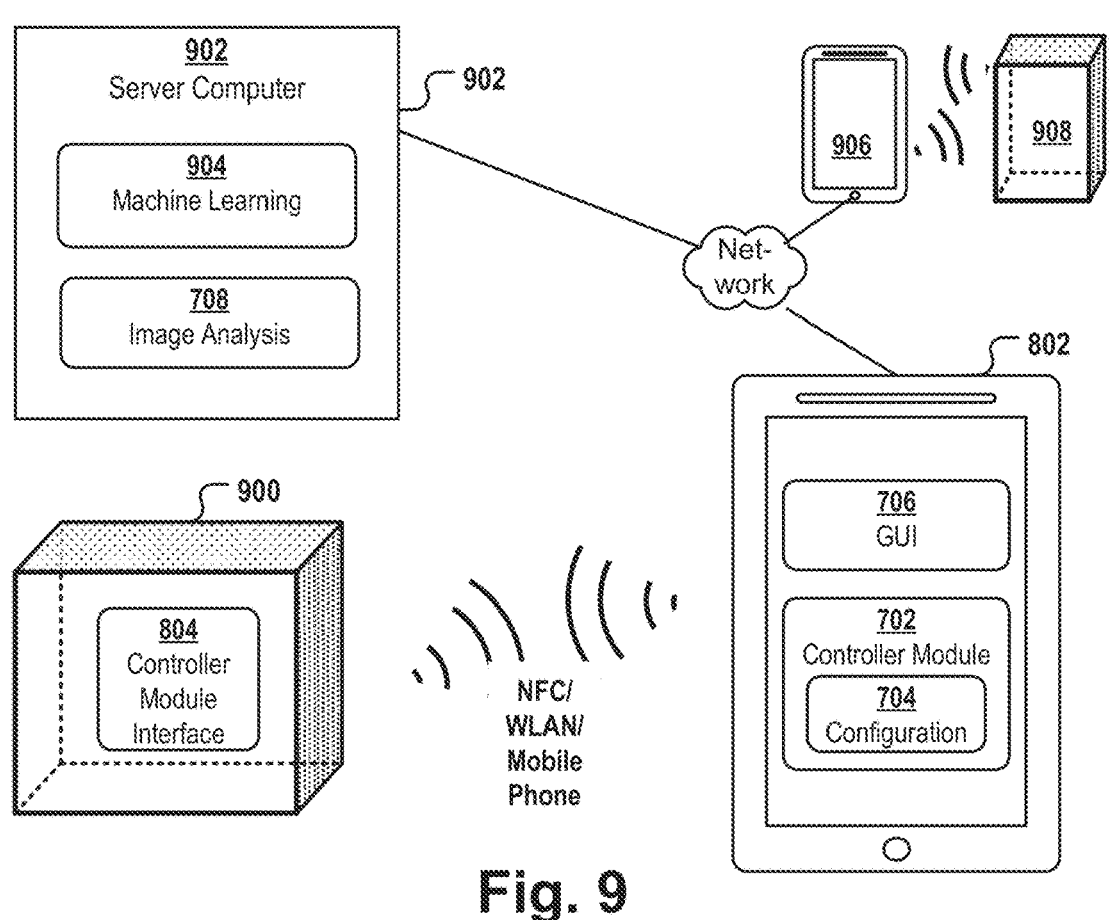
FIG. 9 depicts a system comprising a server, multiple devices and multiple telecommunication devices.

FIG. 9 depicts a system comprising a server computer 902, multiple devices 900, 908 and multiple telecommunication devices 802, 906. The system shown in FIG. 9 includes the system components described with respect to FIG. 8 and additionally the server computer 902 and further system components 906, 908. Preferably, the image analysis software 708 is instantiated on the server computer 902 rather than the device 900 or the telecommunications device 802, since typically the server computer has greater computing capabilities than the device 900 or a smartphone. The controller module 702 on the telecommunication device is interoperable with the interface 804 to receive digital images of surface coatings from the interface and/or to transmit control commands to the interface 804 to determine the mode of operation of the device 900. Further, the controller module 702 is interoperable with the server computer 902, wherein the controller module 702 transmits the digital images of the coated surfaces received from the device 900 over the network to the server computer 902 so that image analysis can be performed by the server computer. The results of the analysis are transmitted by the image analysis software 708 of the server 902 back to the controller module 702 via the network. The controller module can now either output the results directly to the user via the GUI 706 of the telecommunications device 802, and/or transmit the results to the interface 804 of the device 900 so that the results can be output to the user via a display of the device 900.

Typically, the system may include a plurality of further devices 908 and a plurality of further portable telecommunications devices 906, each communicatively coupled to the corresponding device to exchange image data, control commands, and/or image analysis results with the corresponding device.

According to some embodiments, the device 900, portable telecommunications device 802, and/or server computer 902 may also include programs and software frameworks for performing a machine learning process ("machine learning framework 904"). For example, the machine learning framework 904 may include software that enables a user or automatically executable programs to detect and annotate coating defects within a digitalin image. A digital image of surface defects that have already been annotated is shown in photograph 602 of FIG. 6. The framework is configured to receive digital images generated by one or more devices 900, 908. For example, neural networks may be trained on the annotated images of various coating defect types such that the predictive models created during training are capable of identifying and/or quantifying corresponding coating defects in input images. The predictive models may be used to be integrated, optionally together with other models specifically trained to detect and characterize other coating defect types, into a software application, which software application may then be used as image analysis software 708.

According to some examples, the devices and devices depicted in FIGS. 2-4 and 7-9 can be used for generating a training data set. Digital images of many different coated surfaces comprising many different types of coating defects are acquired using the device as described. For the foam defects, a flat light incidence angle may be chosen. For other types of defects, other image acquisition settings and conditions may be chosen. Preferably, a large number of digital images showing several thousand defects of different defect types and different types of coated substrates is acquired which are manually annotated (labelled).

Figure 10:
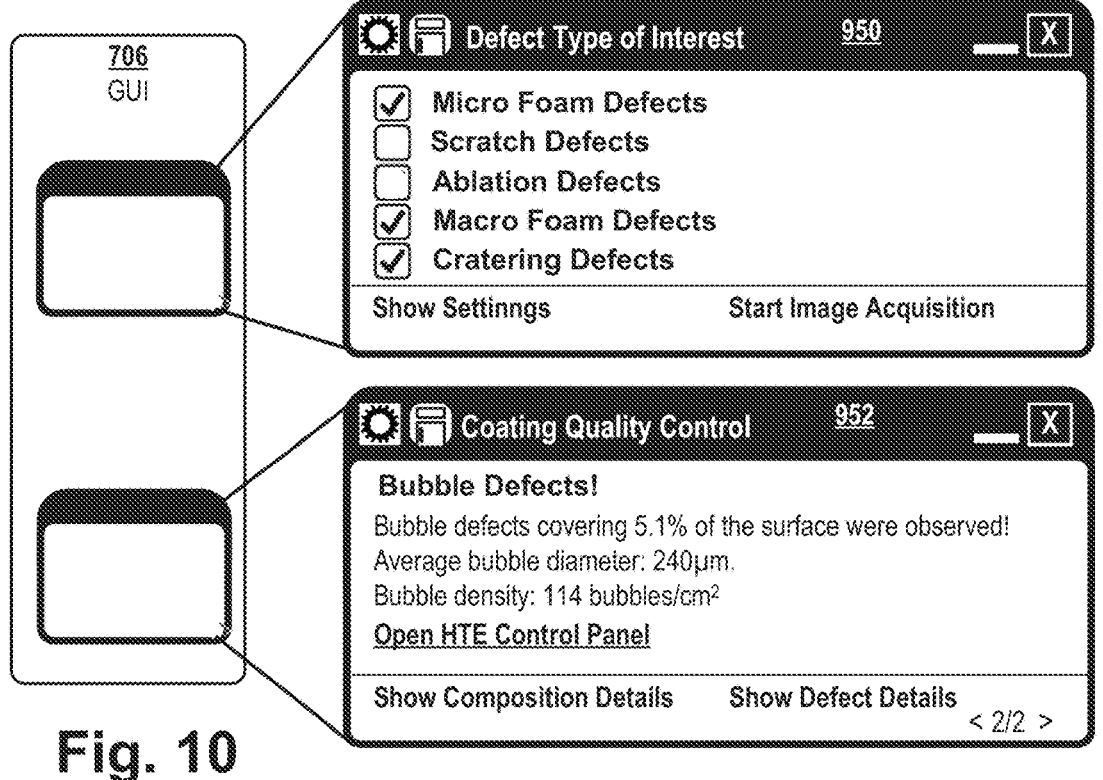
FIG. 10 depicts a GUI enabling a user to select one or more defect types.

FIG. 10 depicts a GUI 706 enabling a user to select one or more defect types. For example, the GUI 706 may be configured to display to the user, in a first window 950, a list of defect types for which the devices shown in FIG. 2-4 or 7-9 have an appropriate mode of operation. This means that the device or the components contained in the device can assume a state that allows its photo to be taken of a coated surface under conditions that allow that particular defect type to be detected with sufficient accuracy. It is possible here that certain modes of operation can be used to detect multiple defect types.

According to the GUI shown in FIG. 10, for each defect type supported by a device, a GUI element selectable by a user, such as a checkbox, may be displayed. According to some examples, after the user selects multiple defect types, the controller module causes the device components to automatically or semi-automatically to sequentially assume an operating mode and/or position suitable for capturing photographs (digital images) in which each of the multiple selected defect types can be identified by the image analysis software. The modification of the position or operation mode of the device components may correspond to and represent different operation modes of the device. For example, after the user selects the three defects "Macro Foam Defect", "Micro Foam Defect" and "Cratering Defects", the controller module may first place the device in a first mode of operation suitable for capturing photographs in which micro foam defects are readily visible and characterizable. In the next step, after the device has captured and stored or forwarded at least one photo in the micro foam defects mode of operation, the controller module causes the device to switch to another mode of operation suitable for capturing photos in which macro foam defects are readily identifiable. After at least one photo has been taken in this operating mode, the controller module ensures that the device switches to another operating mode suitable for capturing photos in which cratering defects can be easily identified. According to some examples, at least one of the device component positions assumed while the controller triggers the sequence of operation mode changes of the device is a defect-type specific height of a sample carrier. After the device has captured the photos for the selected defect types, they are analyzed by image analysis software 708, which may be installed in the device or on an external data processing system 802, 902, to determine the presence and/or severity of the defect for each of the selected defect types in the images captured corresponding to that effect type. The results of this analysis may be output via the GUI 706, for example in another window 952.

The invention claimed is:

1. A method for inspecting a coated surface for a surface defect, the method comprising:

selecting an inspection defect type from among defect types;

using a device for covering the coated surface to be inspected, the device being configured to create an enclosed space to isolate the coated surface to be inspected from ambient illumination in order to provide predefined photographic acquisition conditions based on the inspection defect type within the enclosed space, each of the defect types being associated with respective predefined photographic acquisition conditions;

acquiring a photo of the coated surface being within the enclosed space; and inspecting the photo for a presence of the surface defect.

2. The method of claim 1, wherein the device comprises a housing, the housing being non-transmissive to light, wherein a use of the device comprises covering the coated surface; and/or wherein the device comprises one or more light sources; and/or wherein the device comprises at least one device-internal camera and/or a camera housing opening for enabling at least one device-external camera to capture an image of the coated surface through the camera housing opening, wherein the acquisition of the photo is performed with the at least one device-internal camera or the at least one device external camera.

3. The method of claim 1, wherein the device comprises a sample carrier configured to carry a coated sample comprising the coated surface and move a position of the coated surface in a vertical direction, wherein a use of the device for covering the coated surface comprises placing a sample-on the sample carrier; and/or wherein the device comprises a coated-surface-opening, wherein the coated-surface-opening is an opening within a wall of a housing referred to as contacting wall, the contacting wall being intended for contacting of the coated surface-, wherein the use of the device for covering the coated surface comprises bringing the contacting wall in contact with the coated surface; and/or wherein the device comprises a sample-position marking, wherein the sample-position marking indicates a placement position inside the device where a sample with the coated surface is to be placed.

4. The method of claim 1, wherein the device comprises and/or is operatively coupled to a controller module, the controller module being configured to control an operation of the device.

5. The method of claim 4, further comprising:

providing a configuration, the configuration comprising a plurality of assignments, each assignment assigning one out of a plurality of different coating defect types to one out of device settings, each of the device settings determining one or more device configuration parameters specifying a position and/or a mode of operation of one or more components of the device;

receiving, by the controller module, the selection of the inspection defect types;

identifying, by the controller module, a device setting of the device settings stored in the configuration in association with the inspection defect type;

modifying, by the controller module, at least one component of the device, the at least one component being selected from a group comprising a camera, a light source and/or of a sample carrier in accordance with the identified device setting, thereby setting an operation mode of the device to a defect-type specific image acquisition mode;

wherein the acquisition of the photo is performed while the device is in the defect-type specific image acquisition mode.

6. The method of claim 5, further comprising:

providing a configuration, the configuration comprising a plurality of assignments, each assignment assigning one out of the plurality of different coating defect types to one out of the device settings, each of the device settings determining one or more device configuration parameters specifying the position and/or the mode of operation of one or more components of the device, wherein in particular the one or more components of the device comprise one or more of: the one or more light sources, or the camera, or the sample carrier;

receiving, by the controller module, the selection of the inspection defect types;

identifying, by the controller module, a device setting stored in the configuration in association with the inspection defect type;

outputting, by the controller module, a message to a user, the message being indicative of how to modify the position, orientation and/or mode of operation of at least one component of the device in accordance with the identified device setting, the at least one component being selected from the group comprising the camera, the light source and/or of the sample carrier, the message enabling the user to manually or semiautomatically set the operation mode of the device to the defect-type specific image acquisition mode;

wherein the acquisition of the photo is performed while the device is in the defect-type specific image acquisition mode.

7. The method of claim 2, wherein the device comprises and/or is operatively coupled to a controller module, the controller module being configured to control the operation of the device, and the method further comprising:

providing a configuration, the configuration comprising a plurality of assignments, each assignment assigning one out of a plurality of different coating defect types to one out of multiple device settings, each device setting determining one or more device configuration parameters specifying a position and/or a mode of operation of one or more components of the device;

receiving, by the controller module, the selection of the inspection defect types;

identifying, by the controller module, a device setting stored in the configuration in association with the inspection defect type;

modifying, by the controller module, at least one component of the device, the at least one component being selected from a group comprising a camera, a light source and/or of a sample carrier in accordance with the identified device setting, thereby setting the operation mode of the device to a defect-type specific image acquisition mode;

wherein the acquisition of the photo is performed while the device is in the defect-type specific image acquisition mode; and the device configuration parameters being selected from a group comprising, an identity of each of one or more out of a plurality of light sources comprised in the device to be turned on;

an identity of each of one or more out of the plurality of light sources comprised in the device to be turned off;

light intensity of each of one or more out of the plurality of light sources comprised in the device;

position of each of one or more out of the plurality of light sources comprised in the device, in particular a height and/or a horizontal offset to one or more of walls of the housing of the respective light source;

a distance of each of one or more out of a plurality of light sources comprised in the device to the coated surface;

an illumination angle between each of one or more out of a plurality of light sources comprised in the device and the coated surface;

a position and/or a height and/or a tilt of the sample carrier within the device;

an identity of each of one or more out of a plurality of device-internal cameras comprised in the device, at least one of the plurality of device-internal camera to be used for image acquisition;

the identity of each of one or more out of the plurality of device-internal cameras comprised in the device, a least one of the plurality of device-internal cameras not to be used for image acquisition;

a position of each of one or more out of the plurality of device-internal cameras comprised in the device, in particular a height and/or a horizontal offset to one or more of the walls of the housing of the respective camera;

a distance of each of one or more out of a plurality of cameras comprised in the device to the coated surface;

an image acquisition angle between each of one or more out of a plurality of cameras comprised in the device and the coated surface.

8. The method of claim 4, wherein the device comprises a display configured to display a GUI generated by the controller module.

9. The method of claim 4, wherein the device comprises and/or is operatively coupled to a portable telecommunication device, the portable telecommunication device comprising the controller module.

10. The method of claim 4, the method further comprising:

generating, by the controller module, a graphical user interface—GUI, the GUI being configured to display a plurality of selectable GUI elements respectively representing one of the defect types, wherein the controller module receives the selection of the defect types as a selection of a respective one of the GUI elements by a user as the inspection defect type.

11. The method of claim 10, the method further comprising:

in response to the user selecting multiple inspection defect types via the GUI, the controller module causing components of the device automatically to sequentially assume an operating mode and/or position suitable for capturing images capable of identifying each of the multiple selected defect types by an image analysis software, wherein the controller module is configured to switch the device to another operating mode suitable for capturing photos based on a next selected type of defects to be identified after at least one photo has been takin in a given operating mode of the device, and wherein in particular at least one of the components of the device positions assumed is a defect-type specific height of a sample carrier.

12. The method of claim 5, further comprising:

using at least one camera for acquiring a preview image, the preview image depicting the coated surface;

performing, by the controller module, an initial image analysis of the preview image for identifying at least one type of coating defects depicted in the preview image;

wherein the inspection defect type is the at least one type of the coating defects identified in the initial image analysis.

13. The method of claim 1, wherein the inspection of the photo is performed by an image analysis software and comprises obtaining a qualitative and/or quantitative characterization of the coating defects in the coated surface; and wherein the method further comprises outputting, by the image analysis software, a result of the inspection of photo.

14. The method of claim 1, wherein the device comprises a sample carrier configured to carry a sample with the coated surface to be inspected and move a position of the coating surface in a vertical direction manually or automatically.

15. The method of claim 14, wherein the sample carrier is a manually adjustable lift with a manually movable wheel allowing adjustment of a height of the lift, wherein discrete-markings are displayed on the wheel to indicate a predefined number of different positions of the lift and corresponding heights, the method further comprising:

in response to a user selecting a particular defect type, determining, by a controller module, that the lift should have a predetermined position specifically assigned to the inspection defect type; and informing, by the controller module via a GUI, a user that the wheel of the sample carrier must now be turned until one of the discrete markings on the wheel indicating a position of the lift has reached a target position.

16. The method of claim 1, wherein the device comprises multiple light sources, wherein one of the multiple light sources is a light panel, wherein the light panel represents a sample support plate of a sample carrier or wherein the light panel is placed on top of the sample carrier, and wherein the light panel is configured to serve as a transmission light source for emitting light to pass the coated surface before being acquired by a camera for creating the photo.

17. The method of claim 1, the device comprising light sources, the light sources having different positions and/or orientations, whereby one or more of the light sources are configured to be controlled individually with respect to turned-on state, turned-off state and/or light intensity.

18. The method according claim 1, wherein the device is used for acquiring a plurality of photos of a plurality of coated surfaces, the method further comprising:

storing the acquired photos as digital images in association with image labels in a storage medium, the image labels being indicative of a position and a type of one or more surface defects of one or more different defect types; and inputting the acquired digital images and their associated labels into a machine learning program-configured to perform a machine learning method for learning associations between image features of the acquired digital images and the type and/or amount of image defect indicated in the labels, the learning associations being stored as a trained predictive model;

integrating the trained predictive model in an image analysis software configured to perform a qualitative and/or quantitative characterization of defects in the coated surface of a sample depicted in a digital image provided as input.

19. A device configured to create an enclosed space to isolate a surface coating from ambient illumination in order to provide predefined photographic acquisition conditions within the enclosed space, the device comprising:

a housing, the housing being non-transmissive to light, one or more light sources, at least one device-internal camera inside the housing, the device-internal camera configured to capture an image of the coated surface from within the housing, and/or a camera housing opening in the housing and at least one device-external camera, the device-external camera configured to capture an image of the coated surface through the camera housing opening; and one or more a sample carrier configured to carry a coated surface and move a position of the coated sample in a vertical direction, or a coated-surface-opening, the coated-surface-opening is an opening within a wall of the housing referred to as contacting wall, the contacting wall being intended for planar contacting of the coated surface.

20. A system comprising:

the device of claim 19; and a controller module configured to control an operation of the device; and/or a configuration, the configuration comprising a plurality of assignments, each assignment assigning one out of a plurality of different coating defect types to one out of device settings, each of the device settings determining one or more device configuration parameters specifying a position and/or a mode of operation of one or more components of the device; and/or a computer system-operatively coupled to the controller module, the computer system comprising an image analysis software-configured to perform an image analysis to identify and/or quantify one or more coating defect types in the coated surface depicted in a photo, the computer system being in particular a server computer or a portable telecommunication device.

\* \* \* \* \*